United States Patent [19]

Oyama et al.

[11] Patent Number: 4,745,320
[45] Date of Patent: May 17, 1988

[54] INDUCTION MOTOR

[75] Inventors: Shigeaki Oyama, Hachioji; Kosei Nakamura; Yoshiyuki Hayashi, both of Hino; Shigeru Koyoshida, Omuta, all of Japan

[73] Assignee: Fujitsu Fanuc Limited, Tokyo, Japan

[21] Appl. No.: 395,012

[22] PCT Filed: Oct. 28, 1981

[86] PCT No.: PCT/JP81/00309

§ 371 Date: Jun. 24, 1982

§ 102(e) Date: Jun. 24, 1982

[87] PCT Pub. No.: WO82/01793

PCT Pub. Date: May 27, 1982

[30] Foreign Application Priority Data

Oct. 28, 1980 [JP] Japan .................. 55-150060

[51] Int. Cl.$^4$ .......................................... H02K 1/06
[52] U.S. Cl. ...................... 310/217; 310/42; 310/91; 310/259
[58] Field of Search ............. 310/216, 217, 42, 254, 310/258, 259, 62, 63, 91, 61, 64

[56] References Cited

U.S. PATENT DOCUMENTS

| | | | |
|---|---|---|---|
| 2,610,225 | 9/1952 | Korski | 310/217 |
| 3,235,762 | 2/1966 | Brammerlo | 310/254 |
| 3,313,967 | 4/1967 | Ross | 310/217 |
| 3,414,749 | 12/1968 | Abeg | 310/217 |
| 3,502,916 | 3/1970 | Staurache | 310/62 |
| 3,652,889 | 3/1972 | Reece | 310/217 |
| 3,749,953 | 7/1973 | Baumann | 310/62 |
| 3,885,302 | 5/1975 | Boesel | 310/217 |
| 3,914,630 | 10/1975 | Lloyd | 310/64 |
| 3,940,648 | 2/1976 | Wielt | 310/217 |
| 4,137,472 | 1/1979 | Workman | 310/61 |
| 4,217,510 | 8/1980 | Detinko | 310/216 |
| 4,240,000 | 12/1980 | Harano | 310/64 |
| 4,348,607 | 7/1982 | Tankred | 310/217 |

FOREIGN PATENT DOCUMENTS

| | | | |
|---|---|---|---|
| 13-3131 | 1/1938 | Japan | 310/258 |
| 15-2599 | 2/1940 | Japan | 310/281 |
| 1100589 | 10/1965 | United Kingdom | 310/217 |

Primary Examiner—R. Skudy
Attorney, Agent, or Firm—Armstrong, Nikaido, Marmelstein & Kubovcik

[57] ABSTRACT

An induction motor has a stator formed by inserting and holding piled steel plates (12) between end plates (11a, 11b) and welding support bars (13) consisting of non-magnetic metal along the external surface of said piled steel plates.

3 Claims, 2 Drawing Sheets

INDUCTION MOTOR

DESCRIPTION

1. Technical Field

The present invention relates to an induction motor, more particularly to an induction motor which comprises a stator in which support bars consisting of nonmagnetic metal are welded.

2. Background Art

In induction motors, stators are formed by inserting and holding a stator core, consisting of piled steel plates, between the end plates and welding support bars along the external surface of the piled steel plates. Conventional induction motors of this type have used magnetic metal material such as carbon steel for said support bars.

Induction motors of the above-mentioned structure, however, suffer from the problem that the rotating magnetic field generated in the stator and passing through the inside of the support bars generates and electromotive force in the support bars, thereby causing current to flow in the closed circuit made up of the support bars and the end plates and thereby resulting in power loss.

SUMMARY OF THE INVENTION

The main object of the present invention is to solve the above-mentioned problem of the prior art and provide an induction motor able to decrease the current flowing between the support bars and the end plates in the stator and, therefore, able to decrease power loss.

In accordance with the present invention, there is provided an induction motor characterized by forming a stator by inserting and holding piled steel plates between end plates and welding support bars consisting of nonmagnetic metal along the external surface of said piled steel plates.

BEST MODE FOR CARRYING OUT THE INVENTION

Figure 1:
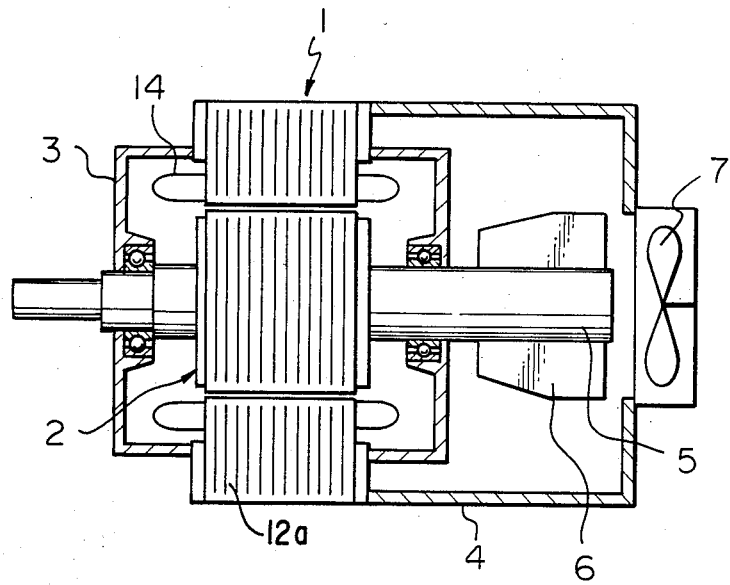
FIG. 1 illustrates a structure of an induction motor in accordance with one embodiment of the present invention.
Figure 2:
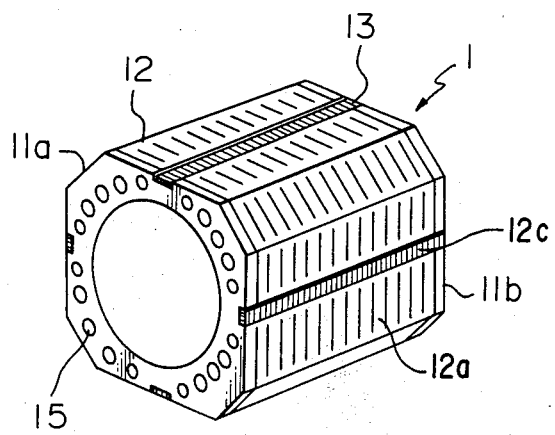
FIG. 2 illustrates a perspective view of a stator of the induction motor of FIG. 1.
Figure 3:
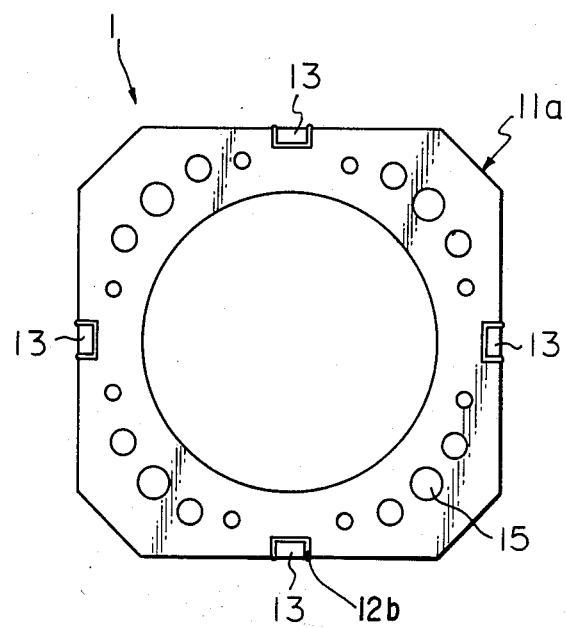
FIG. 3 illustrates a front view of the stator of FIG. 2 seen in the axial direction.

An induction motor in accordance with one embodiment of the present invention is illustrated in FIG. 1. A stator 1 of the induction motor of FIG. 1 is illustrated in FIG. 2 and FIG. 3. The induction motor of FIG. 1 comprises a stator 1 and rotor 2 surrounded by the stator 1. A rotor cover 3 encloses the rotor 2 and an end portion cover 4 encloses one side of the stator 2. The rotor 2 is mounted on a heat pipe shaft 5 which has cooling fins 6 extending therefrom. A fan 7 is position with respect to the cover 4 for generating an air flow to conduct heat from the cooling fins 6.

As shown in FIG. 2, in the stator 1, a stator core 12 consisting of piled or stacked steel plates 12a inserted and held between two end plates 11a and 11b. Each of the steel plates 12a and the end plates 11a and 11b have notches 12b formed therein. The notches are aligned to form grooves 12c on the external surface of the stator 1 in the axial direction of the stator. In these grooves, support bars 13 consisting of nonmagnetic stainless steel are mated. The support bars 13 are welded with the stator core 12, as shown in FIG. 3. In the stator 1, vent holes 15 for cooling are formed along the axial direction.

When passing current through stator windings 14 and generating a rotating magnetic field in the stator core 12, the magnetic flux induced by the magnetic field passes through mainly the gap between the rotor and the stator and through the inside of the stator. Since the stator core has an extremely high magnetic permeability, only extremely little leakage magnetic flux passes through the space around the stator 1 and through the support bars of nonmagnetic material. Accordingly, the induction current generated inside the support bars by the rotating magnetic field generated in the stator is extremely small, therefore power loss due to the above-mentioned inducation current is also extremely small.

Though the above-mentioned embodiment of the present invention uses nonmagnetic stainless steel for the support bars 13, other nonmagnetic materials, such as brass or copper, may also be used.

According to the present invention, the current flowing between the support bars and the end plates in the stator can be decreased, therefore, power loss in the induction motor can be decreased.

I claim:

1. A stator core for an induction motor, said stator core comprising:
   (a) a plurality of stacked steel plates positioned adjacent to one another;
   (b) first and second end plate means, each end plate means being positioned on one end of said stacked steel plates;
   (c) at least one support bar, consisting of a nonmagnetic metal, positioned in contact with each of said steel plates and welded thereto.

2. A stator core as set forth in claim 1, wherein at least one notch is formed in each of said steel plates, said notches being aligned to form at least one groove in said stacked steel plates and wherein said support bar is positioned in said groove.

3. A stator core as set forth in claim 1, wherein said support bar consists of nonmagnetic stainless steel.

* * * * *